United States Patent
Holbach et al.

(10) Patent No.: US 11,369,900 B2
(45) Date of Patent: Jun. 28, 2022

(54) PIPELINE STRAINER WITH MAGNETIC INSERT AND BAFFLE

(71) Applicant: The Metraflex Company, Chicago, IL (US)

(72) Inventors: Daniel T. Holbach, Palatine, IL (US); James R. Richter, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 192 days.

(21) Appl. No.: 16/740,980

(22) Filed: Jan. 13, 2020

(65) Prior Publication Data

US 2020/0222832 A1 Jul. 16, 2020

Related U.S. Application Data

(60) Provisional application No. 62/793,272, filed on Jan. 16, 2019.

(51) Int. Cl.
| | |
|---|---|
| *B01D 35/02* | (2006.01) |
| *F16L 55/24* | (2006.01) |
| *B03C 1/033* | (2006.01) |
| *B03C 1/28* | (2006.01) |
| *B03C 1/30* | (2006.01) |
| *B01D 35/06* | (2006.01) |

(52) U.S. Cl.
CPC ............. *B01D 35/02* (2013.01); *B01D 35/06* (2013.01); *B03C 1/0332* (2013.01); *B03C 1/284* (2013.01); *B03C 1/286* (2013.01); *B03C 1/30* (2013.01); *F16L 55/24* (2013.01); *B03C 2201/18* (2013.01); *B03C 2201/28* (2013.01)

(58) Field of Classification Search
None
See application file for complete search history.

(56) References Cited

U.S. PATENT DOCUMENTS

| | | | | | |
|---|---|---|---|---|---|
| 2,800,230 | A | * | 7/1957 | Thoma | B03C 1/28 210/223 |
| 4,183,812 | A | * | 1/1980 | Rosaen | B01D 35/147 210/131 |

(Continued)

FOREIGN PATENT DOCUMENTS

| | | |
|---|---|---|
| EP | 3557109 A1 | 10/2019 |
| GB | 2562772 A | 11/2018 |

(Continued)

OTHER PUBLICATIONS

Extended European Search report from corresponding European patent application No. 20151659.8-1010, dated Apr. 3, 2020.

*Primary Examiner* — David C Mellon
(74) *Attorney, Agent, or Firm* — Greer, Burns & Crain, Ltd.

(57) ABSTRACT

A pipeline strainer having a body with a straining element therein. One or more magnets are removably inserted into the straining element and configured to be removed from the body without causing liquid within the cavity to drain from the pipeline strainer. A drywell is used to house the magnets. The movement of withdrawing the magnets pulls metal particles along the outer surface of the drywell toward a debris drain. A baffle is disposed at the end of the drywell that is adjacent or near the debris drain to reduce turbulence from the fluid flow within the pipeline strainer.

17 Claims, 2 Drawing Sheets

(56) References Cited

U.S. PATENT DOCUMENTS

| | | | |
|---|---|---|---|
| 2003/0183587 A1* | 10/2003 | Hawkins | B01D 29/23 210/787 |
| 2010/0155336 A1* | 6/2010 | Simonson | F16L 55/24 210/695 |
| 2010/0294706 A1* | 11/2010 | Simonson | B03C 1/286 210/222 |
| 2019/0314744 A1* | 10/2019 | Richter | B01D 35/26 |
| 2020/0129990 A1* | 4/2020 | Lee | B03C 1/0332 |
| 2020/0139275 A1* | 5/2020 | Cowley | B01D 29/33 |

FOREIGN PATENT DOCUMENTS

| | | |
|---|---|---|
| JP | H08117517 A | 5/1996 |
| JP | 2010279886 A | 12/2010 |

* cited by examiner

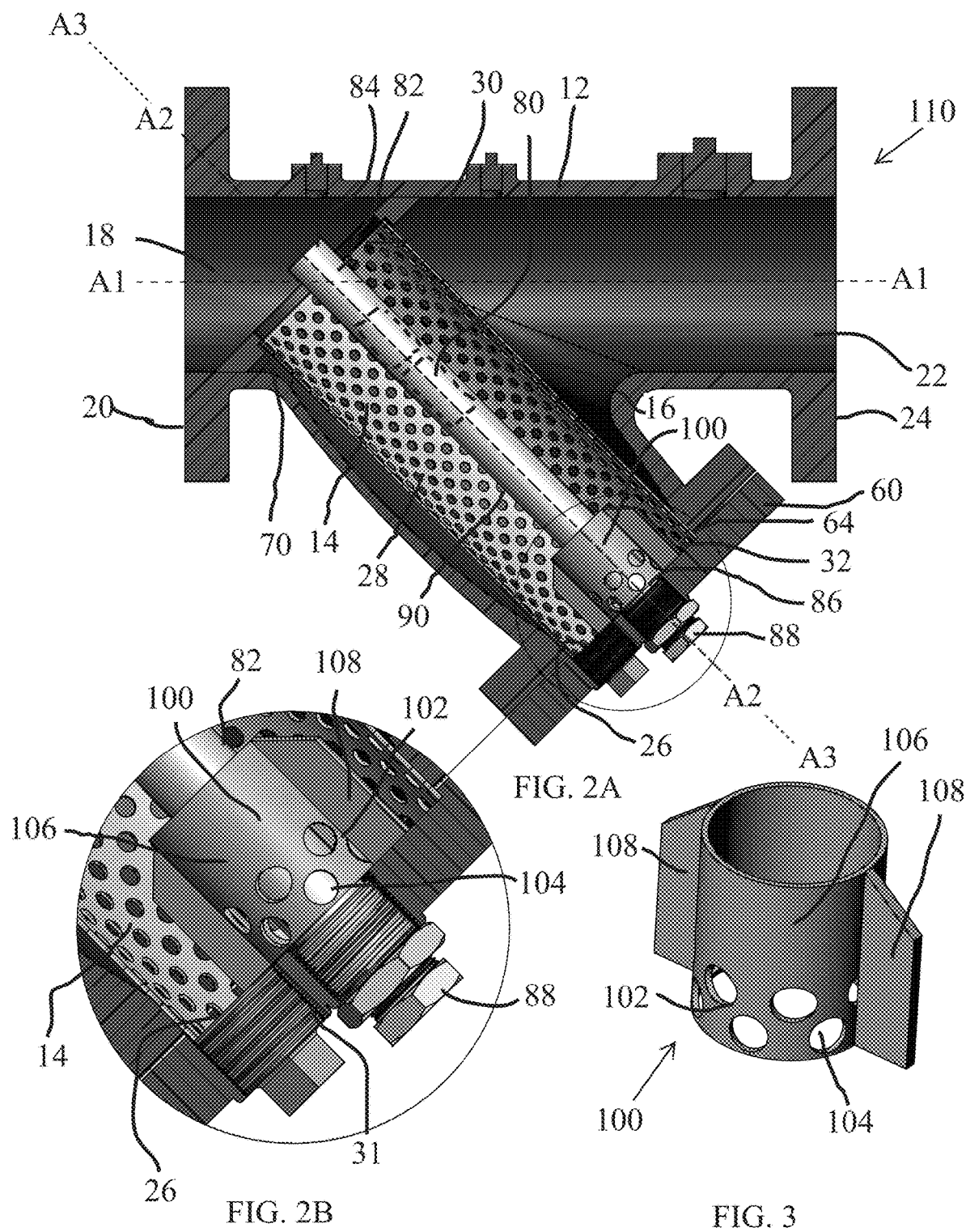

PIPELINE STRAINER WITH MAGNETIC INSERT AND BAFFLE

RELATED APPLICATIONS

This application claims priority to U.S. Provisional Application No. 62/793,272 filed on Jan. 16, 2019, the entirety of which is incorporated herein by reference.

FIELD OF THE INVENTION

The present invention relates to a pipeline strainer, and more particularly to a pipeline strainer that includes a magnet for removing metal particles within a fluid passing through the pipeline strainer.

BACKGROUND OF THE INVENTION

Pipeline strainers are used for protecting pumps, compressors, turbines, meters, automatic valves, sprinkler heads, nozzles, steam traps, heat exchangers, meters, and other pipeline equipment. The pipeline strainer mechanically removes solids from a flowing fluid with a perforated, mesh, or wedge wire straining element. The solids are retained in the straining element, allowing the fluids to flow therethrough and be passed to downstream equipment. After a certain period of time, a drain in the pipeline strainer is opened to remove the retained debris in order to avoid excess pressure drop associated with the collection of solids in the straining element.

Recently, there has been an increase in the interest and use of pumps with motors which utilize magnets. These pumps are believed to be very efficient and thus, desirable in many applications. However, while the pumps may be efficient, the magnets in the pump attract fine metal particles, such as iron oxides, that are in the water. The fine metal particles stick to the pump elements, such as the impellers, negatively impacting the pump's performance. These fine particles have always been present in the water but have not impacted the performance of non-magnetic pumps.

The pores in conventionally used straining elements are typically too large to efficiently remove these fine metal particles from the fluid. Accordingly, some pipeline strainers utilize magnets to attract the metal particles. While presumably effective for their intended purposes, some of these pipeline strainers do not allow for the magnets to be easily removed without taking the pipeline strainer offline Additionally, others do not allow for the magnets to be removed in a quick and efficient manner.

Therefore, it would be desirable to provide a pipeline strainer that allows for magnetic particles to be easily collected and removed. It would also be desirable if such a pipeline strainer provided such a feature without requiring the pipeline strainer to be taken offline.

SUMMARY OF THE INVENTION

A new pipeline strainer has been invented which includes one or more magnets that are configured to be removed from the body without causing liquid within the cavity to drain from the pipeline strainer. A drywell may be used to house the magnets. The movement of withdrawing the magnets pulls metal particles along the outer surface of the drywell toward a debris drain. Thus, the present pipeline strainer provides for magnetic particles in the fluid to be collected and removed in an effective and effective manner Additionally, the present pipeline strainer collects the particles and allows for removal of the collected particles without requiring the pipeline strainer to be taken offline A baffle is used to minimize the particles dispersing when being removed.

Accordingly, in an aspect of the present invention, the present invention may be generally characterized as providing a pipeline strainer having: a body with a Y-shape and an inlet for a fluid, an outlet for a cleaned fluid, a debris drain, and a cavity inside of the body connecting the inlet, the outlet, and the debris drain; a straining element located in the cavity and configured to remove particles from the fluid to provide the cleaned fluid, the straining element having an open first end and an open second end opposite the open first end; at least one magnet located between the open first end and the open second end of the straining element and configured to be removed from the body without causing liquid within the cavity to drain from the pipeline strainer; and, a baffle disposed between the magnet and the debris drain. The baffle may have a cylindrical shape. The baffle may include an upper portion that is non-porous and a lower portion that is porous. The pores of the lower portion may be equally distributed around the lower portion. The baffle may be formed from two discrete baffles. The pipeline strainer may include at least one fin inside of the cavity. The at least one fin may be on the baffle, on the straining element, or on both. The pipeline strainer may include a drywell extending into the cavity, with the at least one magnet located in the drywell. A longitudinal axis of the drywell and a longitudinal axis of the straining element from the open first end to the open second end may be coincident. A threaded cap may be removably secured to an open end of the drywell. The open end of the drywell may be located at a center of the open second end of the straining element. A plurality of magnets may be disposed within the drywell. The pipeline strainer may include a valve disposed in the debris drain. The pipeline strainer may include a removable cover secured to the body with a first shoulder for retaining the open second end of the straining element within the cavity. A second shoulder may be included in the cavity for retaining the open second end of the straining element. The drywell may extend into the cavity from the removable cover. The cavity may include an annular shoulder for the open first end of the straining element.

In another aspect, the present invention may be characterized, broadly, as providing a pipeline strainer which has: a body with an inlet for a fluid, an outlet for a cleaned fluid, a debris drain, and a cavity inside of the body connecting the inlet, the outlet, and the debris drain; a straining element dislocated posed in the cavity and configured to remove particles from the fluid to provide the cleaned fluid, the straining element having an open first end and an open second end opposite the open first end, wherein an angle between a first axis of the body extending from a center of the inlet to a center of the outlet and a longitudinal axis of the straining element extending from the open first end and the open second end is greater than 0 degrees and less than 90 degrees; a drywell extending into the cavity; at least one magnet disposed in the drywell; and a baffle disposed between the drywell and the debris drain. The baffle may have a cylindrical shape. The baffle may include an upper portion that is non-porous and a lower portion that is porous. The pores of the lower portion may be equally distributed around the lower portion. The baffle may be formed from two discrete baffles. The pipeline strainer may include at least one fin inside of the cavity. The at least one fin may be on the baffle, on the straining element, or on both. The at least one magnet may be configured to be removed from the drywell without causing liquid within the cavity to drain from the pipeline strainer. The pipeline strainer may include a removable cover secured to the body, the removable cover including a first shoulder for retaining the open second end of the straining element within the cavity. The pipeline strainer may include an annular shoulder for the open first end of the straining element. A longitudinal axis of the drywell and the longitudinal axis of the straining element may be coincident. An open end of the drywell may be located disposed at a center of the open second end of the straining element. A valve may be in the debris drain.

In a further another aspect, the present invention may be characterized, generally, as providing a pipeline strainer which has: a body with an inlet for a fluid, an outlet for a cleaned fluid, a debris drain, and a cavity inside of the body connecting the inlet, the outlet, and the debris drain; a straining element in the cavity and configured to remove particles from the fluid to provide a cleaned fluid, the straining element having an open first end and an open second end opposite the open first end; a drywell extending into the straining element in the cavity; at least one magnet disposed in the drywell and configured to be removed from the drywell without causing liquid within the cavity to drain from the pipeline strainer; a removable cover secured to the body, the removable cover having a first shoulder for retaining the open second end of the straining element within the cavity, wherein a second shoulder is in the body for retaining the open second end of the straining element; and a baffle disposed between the drywell and the debris drain. An end of the drywell may be located in the removable cover. The baffle may have a cylindrical shape. The baffle may include an upper portion that is non-porous and a lower portion that is porous. The pores of the lower portion may be equally distributed around the lower portion. The baffle may be formed from two discrete baffles. The pipeline strainer may include at least one fin inside of the cavity. The at least one fin may be on the baffle, on the straining element, or on both. An angle between a first axis of the body extending from a center of the inlet to a center of the outlet and a longitudinal axis of the straining element extending from the open first end to the open second end may be greater than 0 degrees and less than 90 degrees. A longitudinal axis of the drywell and the longitudinal axis of the straining element are coincident.

These and other aspects and embodiments of the present invention will be appreciated by those of ordinary skill in the art based upon the following description of the drawings and detailed description of the preferred embodiments.

BRIEF DESCRIPTION OF THE DRAWING

The attached drawings will make it possible to understand how the invention can be produced and practiced, in which:

FIG. 2A is a partially cutaway, side view of a pipeline strainer according to one or more embodiments of the present invention;

FIG. 2B is a close-up view of a portion of FIG. 2A; and,

FIG. 3 is a top and front perspective view of the baffle of the embodiment shown in FIGS. 2A and 2B.

DETAILED DESCRIPTION OF THE PREFERRED EMBODIMENTS

Figure 1:
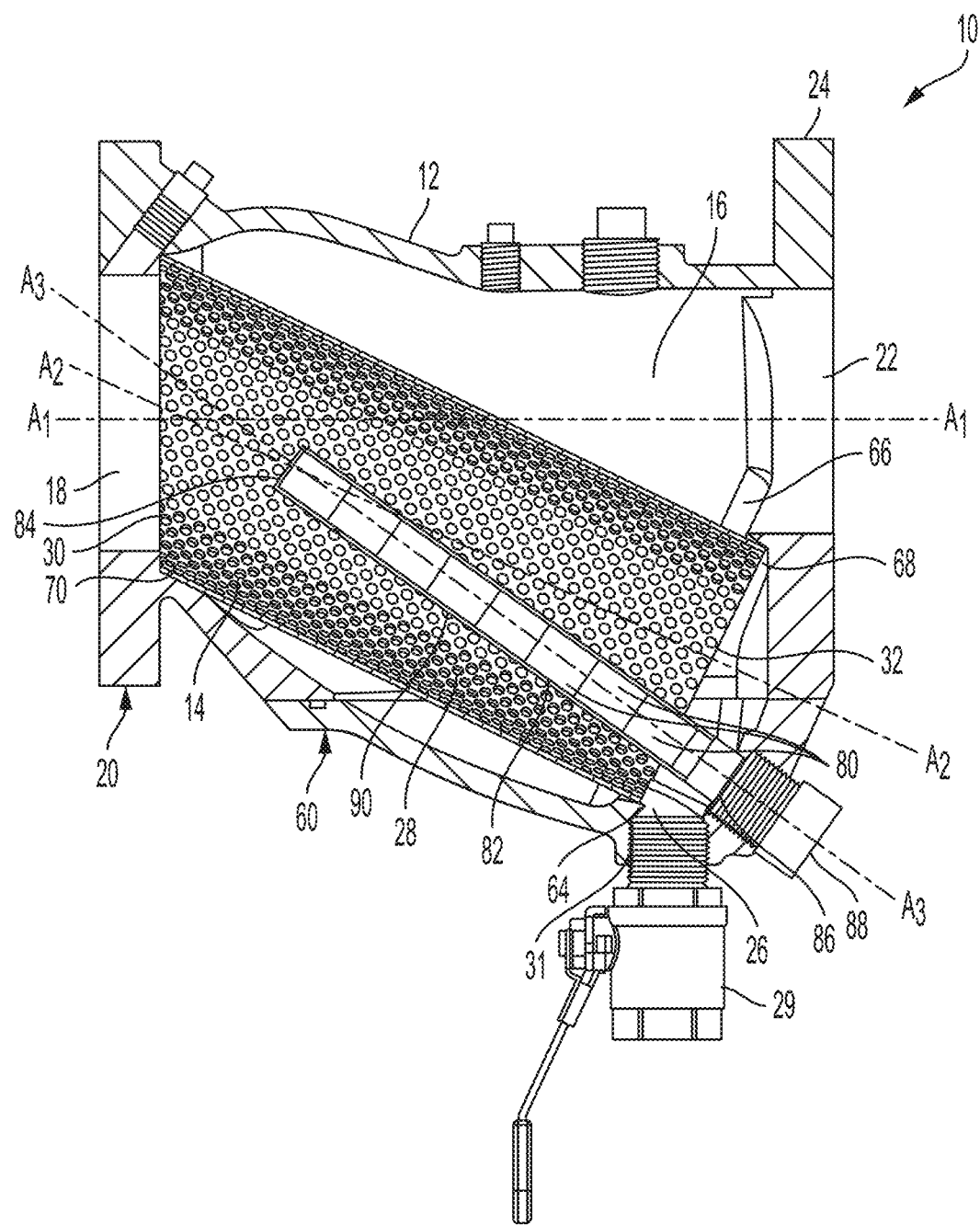
FIG. 1 is a partially cutaway, side view of a pipeline strainer that may be used in accordance with one or more embodiments of the present invention.

As mentioned above, a new pipeline strainer has been invented which includes a magnet removably inserted into the body.

Accordingly, with reference the attached drawing, one or more embodiments of the present invention will now be described with the understanding that the described embodiments are merely preferred and are not intended to be limiting.

With reference to FIG. 1, a pipeline strainer 10 typically comprises a body 12. The body 12 can be made from a variety of appropriate materials, including, for example, iron, carbon steel, carbon moly, stainless steel, chrome moly, aluminum, bronze, monel, nickel, HASTELLOY® B, HASTELLOY® C, titanium, and plastic.

The pipeline strainer 10 also includes a straining element 14. Inside of the body 12 is a cavity 16 which houses the straining element 14. The body 12 includes an inlet 18 to the cavity 16 for a fluid disposed at a first end 20 of the body 12. An outlet 22 from the cavity 16 for cleaned fluid is disposed at a second end 24 of the body 12. The inlet 18 and outlet 22 of the body 12 are both generally circular and have an axis $A_1$ extending through the centers of the inlet 18 and the outlet 22.

The body 12 also includes a debris drain 26 that is disposed in a portion of the cavity 16 that comprises a debris collection chamber 28 that houses the straining element 14. The debris drain 26 is positioned at a lower end of the debris collection chamber 28 so that retained debris will collect at the debris drain 26 under the influence of gravity. In the depicted embodiment, a ball valve 29 is disposed in the debris drain 26. The ball valve 29 allows for debris within the straining element 14 to be removed from the body 12 while the body is still in line and under pressure of the fluid being passed there through. The ball valves 29 are known in the art and may be secured in the debris drain 26 via a threaded portion engaging a threaded bore 31 of the debris drain 26.

A longitudinal axis $A_2$ of the straining element 14 extends from a first end 30 to a second end 32. Preferably, both the first end 30 and the second end 32 are open, preferably fully opened. The second end 32 is disposed proximate the debris drain 26 of the body 12, when the straining element 14 is inserted therein. In various embodiments, at least the first end 30 of the straining element 14 is planar and lies in a first plane. The second end 32 of the straining element 14 may also be planar and lie in a second plane. In at least one embodiment, the first plane, which includes the first end 30 of the straining element 14, is disposed obliquely to the longitudinal axis $A_2$ of the straining element 14. The second end 32 of the straining element 14 may be disposed perpendicular to the longitudinal axis $A_2$ of the straining element 14. The straining element 14 is preferably tubular, and the longitudinal axis $A_2$ of the straining element 14 passes through the centers of the circular open ends 30, 32.

Thus, in the depicted embodiment, the body 12 of the pipeline strainer 10 has a Y-shape in which an angle between the axis $A_1$ of the body 12 and the longitudinal axis $A_2$ of the straining element 14 is less than 90°. Preferably, the angle is between 0 to 60°, and most preferably, the angle is less than 30° and greater than 9.5°. For example, preferred angles include may be about 22.0°, 22.5°, 23.0°, 23.5°, 24.0°, 24.5°, 25.0°, 25.5°, 26.0°, 26.5°, 27.0°, 27.5°, 28.0° or 28.5°. By the term "about" with respect to the angle between the axis $A_3$ of the straining element 14 and the axis $A_1$ of the body 12, it is intended to mean the stated angle+/−0.3°. Such pipeline strainers are disclosed in U.S. Pat. Pub. No. 2016/0206982, the entirety of which is incorporated herein by reference.

However, it is also contemplated that the angle between the axis $A_1$ of the body 12 and the longitudinal axis $A_2$ of the straining element 14 is 90°—in which the pipeline strainer comprises a basket strainer—such as shown in FIG. 4 of U.S. Pat. No. 5,718,822 (the entirety of which is incorporated herein by reference).

In order to insert the straining element 14 into the cavity 16 of the body 12, a removable cover 60 is secured to body 12. The cover 60, with the body 12, forms the cavity 16. The cover 60 includes a first shoulder 64 configured to retain the second end 32 of the straining element 14 in position when the cover 60 is closed. An inner surface 66 of the cavity 16 includes a second shoulder 68 for retaining the second end 32 of the straining element 14 in position when the cover 60 is closed. Additionally, an annular shoulder 70, located at the first end 20 and preferably in or on an inner side of the inlet 18, retains the first end 30 of the straining element 14 in position when the cover 60 is closed. Such pipeline strainers with covers are disclosed in U.S. Pat. Pub. No. 2016/0263503, the entirety of which is incorporated herein by reference.

Various materials can be used for the straining element 14 including carbon steel, stainless steel, monel, HASTELLOY® B, HASTELLOY® C, Alloy 20, nickel, brass, copper, galvanized steel, INCOLOY®, INCONEL®, titanium, aluminum, and plastic, to name a few. The straining element 14 can also be lined with various coatings to minimize corrosion, such as epoxy, asphalt, polytetrafluoroethylene, vinyl, polychlorotrifluoroethene, rubber, neoprene, baked phenolic, and plating with zinc, cadmium, nickel, galvanizing, etc.

One consideration in the selection of a straining element 14 material is the size of the perforations, mesh or wedge wire opening used in the making of the straining element 14 based upon the size and quantity of particles which can pass through downstream equipment without causing damage to the equipment. The use of smaller holes than those actually required, can lead to too-frequent cleaning, excessive pressure drops, and screens constructed of thinner metal which will withstand less pressure differential. Generally, stainless steel perforated metal may be typically obtained in a thickness which is one gage thickness less than the diameter of the punched holes. Carbon steel and brass can be obtained in approximately the same thickness as the hole diameter. A common way to accomplish fine straining in large straining elements 14 is by mesh lining a larger hole, heavier gage perforated plate.

The capacity ratio, or open area ratio (OAR) of the straining element 14 influences such operating characteristics as the length of time it can operate without cleaning and the created pressure loss. The OAR is the relationship between internal cross sectional area (flow area) of the pipe and the open flow area of the material which makes up the straining element 14.

A straining element 14 with at least 100% OAR, or 1-to-1 ratio, would provide an unrestricted flow area equal to that of the pipe while the element was clean. A straining element 14 with a 400% OAR is acceptable for general heating and air conditioning service. Additionally, larger OARs would be appropriate for flow in which much debris is expected to be strained or where very viscous fluids are being handled.

When considering the OAR of a straining element 14, there are two accepted methods of analysis used by various specifying agencies and manufacturers. One method maintains a "line of sight" reasoning and uses the multiple of the open areas material for elements in series. In this method, a 60% open area material in series with a 40% open area material has a resultant combined open area of 24% (i.e., as in accordance with military standards).

An alternative method allows the open area of the more restrictive element in series to be used. This would be 40% for the example above (i.e., as in accordance with Underwriter Laboratory Standards). The method used influences the estimated operating pressure drop, as well as design decisions such as sizing.

As an example, fuel oils are generally strained to a fine degree to protect small orifices in burner nozzles. This requires a fine woven mesh be used in series with a reinforcing perforated plate. Due to the fact that the perforated plate may have a 50% open area and the mesh 30%, the resultant combined open area may be considered to be only 15% if there is no flow path other than line of sight through the two elements in series. This would require a straining element 14 with an OAR of 250%, which would be considered a high capacity, large bodied straining element 14. However, this same straining element 14 using only the perforated plate would have an OAR more than three times as great. Thus, for a given straining element 14, the OAR may be varied by using various perforations or meshes having different open areas.

Most pump installations designed for reasonable velocities will permit approximately a 2-psi drop across the straining element 14. When the straining element 14 becomes clogged, the pressure drop varies with the clogging pattern experienced and the type of the straining element 14 being used. If large amounts of solids are expected, use a straining element 14 with a high net open area. As a straining element 14 becomes clogged to the point where the OAR of the straining element 14 approaches the pipe area, the pressure drop across the straining element 14 increases very rapidly and unpredictably. It is at this point, therefore, that it is recommended the straining element 14 be cleaned, discussed below, otherwise, a large differential pressure will develop. The maximum differential pressure the straining element 14 can withstand varies widely with the straining element 14 type, line size and material used.

As fluids with debris are passed through the straining element 14, the debris is collected and accumulated in the straining element 14. The cleaned fluid, having a lower amount of debris, will pass out of the straining element 14. After passing out of the straining element 14, cleaned fluid exits the body 12 via the outlet 22.

However, as indicated above, due to the use of pumps that include magnetic motors, it is desirable to remove metal particles that are too fine to be efficiently retained by the pores in the straining element 14 from the fluid passing through the pipeline strainer out of the pipeline strainer 10.

Accordingly, the pipeline strainer 10 includes one or more magnets 80, and preferably, a plurality of magnets 80. The magnets 80 may be cylindrically shaped. While some conventional pipeline strainers provide magnets 80 for removing the fine metal particles, these conventional pipeline strainers do not provide for the ability to easily and efficiently remove the retained metal particles from the cavity 16. In contrast, in the present pipeline strainer 10, the one or more magnets 80 are configured to be removed from the body 12 without causing liquid within the cavity 16 to drain from the pipeline strainer 10.

In an exemplary embodiment, a drywell 82 extends into the cavity 16 from, for example, the cover 60. The drywell 82 includes a closed end 84 (located within the cavity 16, and specifically within the straining element 14) and an open end 86 through which the one or more magnets 80 are inserted and removed. A removable cap 88 may be secured to the open end 86 of the drywell 82. Due to the presence of the magnets 80 in the drywell 82, the fine metal particles on the inside of the straining element 14 will collect on an outer surface 90 of the drywell 82. Accordingly, it is preferred that the drywell 82 is made from a nonmagnetic material and may be different from the material for the body 12 and cover 60.

The drywell 82 has a longitudinal axis $A_3$ extending from the open end 86 to the closed end 84. Preferably, the longitudinal axis $A_3$ of the drywell 82 and the longitudinal axis $A_2$ of the straining element 14 are offset. Additionally, the open end 86 of the drywell 82 is preferably located in the cover 60, and most preferably at a position within the perimeter of the second end 32 of the straining element 14 (when viewed from the first end 30) between the debris drain 26 and a center of the second end 32 of the straining element 14. In other words, a portion of the drywell 82 is located between the debris drain 26 and the center of the second end 32.

In order to remove the collected metal particles, the threaded cap 88 is removed from the open end 86 of the drywell 82. The magnets 80 are withdrawn, preferably slowly and downwardly, from the drywell 82. As the magnets 80 are withdrawn from the drywell 82, the metal particles collected on the outer surface 90 of the drywell 82 are pulled along in the same direction generally toward the debris drain 26. Once the magnets 80 are withdrawn completely from the drywell 82, the fine metal particles will no longer be attracted to the outer surface 90 of the drywell 82 and fall downward to the debris drain 26. The ball valve 29 is opened to blow out the debris in the debris collection chamber 28, including the metal particles that are mostly accumulated at the bottom of the debris collection chamber 28—proximate the debris drain 26.

The various embodiments of the present invention provide a pipeline strainer 10 that provides for retained metal particles to be removed more quickly from the pipeline strainer 10 since it does not require the pipeline strainer 10 to be taken offline Indeed, the pipeline strainer 10 is preferably still under pressure to facilitate the removal of the collected debris, including the fine metal particles, from the debris collection chamber 28 (via the ball valve 29). Furthermore, the positioning of the open end 86 of the drywell 82 and the debris drain 26 provides for quicker and more efficient removal of the metal particles since the withdrawal of the magnets results in the collected metal particles being pulled towards the debris drain 26.

However, turning to FIGS. 2A, 2B and 3, an embodiment of the present invention is shown which includes a pipeline strainer 110. In the pipeline strainer 110 of FIGS. 2A and 2B, the same reference numerals from the embodiment of FIG. 1 are used for identical features and the above discussion regarding these features is incorporated herein by reference.

In FIGS. 2A and 2B, the angle between axis $A_1$ extending through the centers of the inlet 18 and the outlet 22 and the longitudinal axis $A_2$ of the straining element 14 extending from the first end 30 to the second end 32 is greater than the angle for the pipeline strainer 10 shown in FIG. 1. Additionally, the first end 30 and the second end 32 of the straining element 14 lie in planes that are parallel. Such pipeline strainers are depicted in FIG. 4 of U.S. Pat. No. 5,718,822.

It is believed that there is an increased level of turbulence at or near the debris drain 26 for these types of pipeline strainers (relative to the turbulence in the strainer showed in FIG. 1). This increased turbulence will disperse the collected metal particles (that have been moved to the bottom of the drywell 82 as discussed above) when the debris drain 26 is opened. This will cause a portion of the dispersed metal particles to flow downstream of the pipeline strainer 110 instead of being drawn out of the debris drain 26.

As shown in FIGS. 2A and 2B a baffle 100 is provided in the cavity 16 of the pipeline strainer 110. The baffle 100 may be secured to the pipeline strainer 110 by any number of conventional fasteners or securing methods, including, for example gluing, clamping, welding, brazing, or weld clip, to name a few. Although not depicted as such it is contemplated that the baffle 100 is provided in the pipeline strainer 10 of FIG. 1.

The baffle 100 may have a generally tubular shape (see FIG. 3) that may be concentric with the drywell 82. The baffle 100 has a lower portion 102 that includes a plurality of pores 104 for allowing fluid (and metal particles) to flow through the baffle 100. The pores 104 are shown as having a circular shape, however, the pores 104 may have a shape that is a diamond, square, oval, triangular, or any other shapes. Additionally, while the pores 104 are shown distributed equally about a circumference of the lower portion 102, the arrangement of the pores 104 could be adjusted to direct the flow of fluid so that the pores 104 are not equally distributed around the lower portion 102. An upper portion 106 of the baffle 100 is solid (non-porous). Other configurations are contemplated.

Further, the baffle 100 may include more or more fins 108 or flow directing vanes to further control the flow of fluid around the baffle 100. The fins 108 direct the flow of fluid and are not coplanar with the baffle 100. It is also contemplated (but not depicted) that the straining element 14 includes one or more fins 108 to further reduce the turbulence proximate the debris drain 26 and minimize the chances that the metal particles are released downstream of the pipeline strainer 110 instead of being pulled out of the debris drain 26.

The baffle 100, as shown best in FIG. 3, when viewed along a central longitudinal axis, has a circular shape. However, other shapes may be used, for example, oval, diamond, triangular, C-shape, U-shape, V-shape, octagonal, star-shaped. As an exemplary embodiment, it is contemplated that the baffle 100 has a star-shape and the intersecting arms of the baffle 100 (that form the star) are elongated—forming the fins 108 of the baffle 100. Additionally, the baffle 100 may be formed from two discrete pieces, for example, two linear baffles 100 may be used that, when viewed from a top (along the axis of the drywell 82), have a V-shape. Again, other shapes and arrangements may be used to control the flow of fluids.

In addition to the presence of the baffle 100, in the pipeline strainer 110 of FIGS. 2A and 2B, the axis $A_3$ of the drywell 82 and the axis $A_2$ of the straining element 14 are depicted as being coincident. This is merely an illustrative embodiment, and the two may be parallel, but not coincident, askew, or intersecting.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of my contribution to the art.

The invention claimed is:

1. A pipeline strainer comprising:
    a body having a Y-shape and comprising an inlet for a fluid, an outlet for a cleaned fluid, a debris drain, and a cavity inside of the body connecting the inlet, the outlet, and the debris drain;

a straining element disposed in the cavity and configured to remove particles from the fluid to provide the cleaned fluid, the straining element having an open first end and an open second end opposite the open first end;

at least one magnet disposed between the open first end and the open second end of the straining element and configured to be removed from the body without causing liquid within the cavity to drain from the pipeline strainer; and, a baffle disposed, inside of the straining element, between the magnet and the debris drain, wherein the baffle comprises a cylindrical shape.

2. The pipeline strainer of claim 1, wherein the baffle comprises an upper portion that is non-porous and a lower portion that is porous.

3. The pipeline strainer of claim 2, wherein the pores of the lower portion are equally distributed around the lower portion.

4. The pipeline strainer of claim 1, further comprising at least one fin disposed on the baffle.

5. The pipeline strainer of claim 1 further comprising a drywell extending into the cavity, the at least one magnet disposed in the drywell.

6. A pipeline strainer comprising:
a body comprising an inlet for a fluid, an outlet for a cleaned fluid, a debris drain, and a cavity inside of the body connecting the inlet, the outlet, and the debris drain;
a straining element disposed in the cavity and configured to remove particles from the fluid to provide the cleaned fluid, the straining element having an open first end and an open second end opposite the open first end, wherein an angle between a first axis of the body extending from a center of the inlet to a center of the outlet and a longitudinal axis of the straining element extending from the open first end and the open second end is greater than 0 degrees and less than 90 degrees;
a drywell extending into the cavity;
at least one magnet disposed in the drywell; and,
a baffle disposed, inside of the straining element, between the drywell and the debris drain, wherein the baffle comprises an upper portion that is non-porous and a lower portion that is porous.

7. The pipeline strainer of claim 6, wherein the baffle comprises a cylindrical shape.

8. The pipeline strainer of claim 6, wherein the pores of the lower portion are equally distributed around the lower portion.

9. The pipeline strainer of claim 6, further comprising at least one fin disposed on the baffle.

10. The pipeline strainer of claim 6 wherein the at least one magnet is configured to be removed from the drywell without causing liquid within the cavity to drain from the pipeline strainer.

11. The pipeline strainer of claim 10, wherein an open end of the drywell is disposed at a center of the open second end of the straining element.

12. A pipeline strainer comprising:
a body comprising an inlet for a fluid, an outlet for a cleaned fluid, a debris drain, and a cavity inside of the body connecting the inlet, the outlet, and the debris drain;
a straining element disposed in the cavity and configured to remove particles from the fluid to provide a cleaned fluid, the straining element having an open first end and an open second end opposite the open first end;
a drywell extending into the straining element in the cavity;
at least one magnet disposed in the drywell and configured to be removed from the drywell without causing liquid within the cavity to drain from the pipeline strainer;
a removable cover secured to the body, the removable cover comprising a first shoulder for retaining the open second end of the straining element within the cavity, wherein a second shoulder is in the body for retaining the open second end of the straining element;
a baffle disposed, inside of the straining element, between the drywell and the debris drain,
wherein an end of the drywell is disposed in the removable cover; and,
at least one fin disposed on the baffle.

13. The pipeline strainer of claim 12, wherein the baffle comprises a cylindrical shape.

14. The pipeline strainer of claim 12, wherein the baffle comprises an upper portion that is non-porous and a lower portion that is porous.

15. The pipeline strainer of claim 14, wherein the pores of the lower portion are equally distributed around the lower portion.

16. The pipeline strainer of claim 12, wherein an angle between a first axis of the body extending from a center of the inlet to a center of the outlet and a longitudinal axis of the straining element extending from the open first end to the open second end is greater than 0 degrees and less than 90 degrees.

17. The pipeline strainer of claim 12, wherein a longitudinal axis of the drywell and the longitudinal axis of the straining element are coincident.

* * * * *